US006118978A

United States Patent [19]

Ihmels

[11] Patent Number: 6,118,978

[45] Date of Patent: Sep. 12, 2000

[54] TRANSVERSE-ELECTRIC MODE FILTERS AND METHODS

[75] Inventor: Ralf R. Ihmels, Redondo Beach, Calif.

[73] Assignee: Hughes Electronics Corporation, El Segundo, Calif.

[21] Appl. No.: 09/067,913

[22] Filed: Apr. 28, 1998

[51] Int. Cl.[7] .............................. H04B 7/185; H01P 3/123

[52] U.S. Cl. .......................... 455/12.1; 333/208; 333/212

[58] Field of Search .................................... 333/208–212, 333/248, 230; 455/12.1

[56] References Cited

U.S. PATENT DOCUMENTS

| | | | |
|---|---|---|---|
| 3,271,706 | 9/1966 | Rooney | 333/210 |
| 3,949,327 | 4/1976 | Chapell | 333/208 X |
| 4,675,631 | 6/1987 | Waggett | 333/212 X |
| 5,254,963 | 10/1993 | Bonetti et al. | 333/212 X |
| 5,256,990 | 10/1993 | Young | 333/208 |

FOREIGN PATENT DOCUMENTS

| | | | |
|---|---|---|---|
| 64-60003 | 3/1989 | Japan | 333/210 |

OTHER PUBLICATIONS

Matthaei, George L., et al., *Microwave Filters, Impedance Matching Networks and Coupling Structures*, Artech House, 1993, Norwood, MA, sections 3.1.3 and 7.0.4.

*Primary Examiner*—Seungsook Ham
*Attorney, Agent, or Firm*—Georgann S. Grunebach; M. W. Sales

[57] ABSTRACT

A transverse-electric waveguide filter is provided for transmitting a fundamental transverse-electric mode in a first frequency band while attenuating an associated higher-order transverse-electric mode in a second frequency band. The filter includes transverse corrugations between input and output waveguide ports to attenuate the higher-order transverse-electric mode. The input and output waveguide ports have a characteristic impedance and the filter also incudes a ridge system that is coupled between the first and second waveguide ports and is configured to provide a signal-path impedance that substantially matches the characteristic impedance to thereby support transmission of the fundamental transverse-electric mode from the input port to the output port.

18 Claims, 5 Drawing Sheets

TRANSVERSE-ELECTRIC MODE FILTERS AND METHODS

BACKGROUND OF THE INVENTION

1. Field of the Invention

The present invention relates generally to waveguide structures and more particularly to waveguide filters.

2. Description of the Related Art

Of the various types of electromagnetic transmission structures, closed metal cylinders are often the transmission line of choice when low loss and high power are critical parameters. These closed cylinders are called waveguides with each waveguide type having a characteristic cross-sectional configuration (e.g., rectangular and circular). Waveguides generally operate as though they were high pass filters (i.e., they have cutoff frequencies $f_c$ and electromagnetic signals at frequencies below $f_c$ are not propagated).

The conducting walls of rectangular waveguides establish boundary conditions that permit the presence of distinct electromagnetic field configurations. These configurations are known as waveguide transmission modes and they are dependent on waveguide characteristics (e.g., cross-sectional dimensions and waveguide dielectric properties). By convention, the wide and narrow walls of rectangular waveguides (and their dimensions) are respectively represented by the letters a and b. In rectangular waveguides, the most common modes are transverse electric modes ($TE_{mn}$) and transverse magnetic modes ($TM_{mn}$) in which the subscripts m and n respectively represent the number of half-cycles of field variations along the a and b waveguide walls. Each mode is associated with a respective cutoff frequency and the mode with the lowest cutoff frequency is referred to as the fundamental mode with other modes referred to as higher-order modes.

The dominant mode in rectangular waveguides is the fundamental $TE_{10}$ mode whose electric field lines 22 and magnetic field lines 24 are shown in the waveguide 20 of FIG. 1A. Note that the electric field vectors 22 define a single half-cycle field variation along the a dimension of the waveguide 20 and the vector magnitudes diminish to zero at the conducting side walls b. There are no field variations along the b dimension. The cutoff frequency and cutoff wavelength ($\lambda_c$) in the $TE_{10}$ mode are given by $$(f_c)_{TE_{10}} = \frac{1}{2a\sqrt{\mu\varepsilon}} \text{ and} (\lambda_c)_{TE_{10}} = 2a$$

in which $\mu$ and $\epsilon$ are respectively permeability and permittivity.

FIG. 1B shows the electric field lines 26 and magnetic field lines 28 of the $TE_{20}$ higher-order mode in the waveguide 20. Note that the electric field vectors 26 define two half-cycle field variations along the waveguide's a dimension. The cutoff frequency and cutoff wavelength in the $TE_{20}$ mode are given by $$(f_c)_{TE_{20}} = \frac{1}{a\sqrt{\mu\varepsilon}} \text{ and} (\lambda_c)_{TE_{10}} = a.$$

Because of its electric field pattern's symmetry with respect to a/2, the $TE_{10}$ mode is called a symmetric mode. In contrast, the $TE_{20}$ mode is considered to be an asymmetric mode.

In an electronic system, nonlinear transmission processes (e.g., nonlinear amplification) are the typical generators of harmonics (signals having frequencies which are integral multiples of a fundamental signal's frequency). In contrast, waveguide width and height discontinuities (e.g., H-plane and E-plane bends, screws, probes, misaligned flanges and wall dents) are the prime generators of higher-order modes. Although symmetric discontinuities (e.g., a symmetric inductive iris) generally generate symmetric modes, asymmetric discontinuities (e.g., a misaligned waveguide junction) can generate symmetric and asymmetric modes.

In a waveguide system that is fed by a fundamental mode, any discontinuity (e.g., an iris or a probe) establishes a complex set of local boundary conditions which can only be satisfied by the presence of a plurality of higher-order modes that are coupled to the fundamental mode. If the transmission frequency is in the waveguide's monomode region (i.e., the frequency region between the fundamental cutoff frequency and the nearest higher-order mode's cutoff frequency), these higher-order modes will be evanescent (i.e., they decay exponentially in the vicinity of the discontinuity). In this situation, the higher-order modes are only required locally to satisfy local boundary conditions and do not propagate through the system. Although a portion of the fundamental mode's energy was locally converted to the higher-order modes, this energy portion is converted back to the fundamental mode as the higher-order modes decay.

Conversely, if the operating frequency is above the waveguide's monomode region or an integral mulitple of the transmit frequency, one or more higher-order modes decouple from the fundamental mode and each of them independently propagates through the waveguide system with different phase velocities (i.e., with different guide wavelengths). The waveguide system is then said to be overmoded and the energy portion that was converted from the fundamental mode is not returned but is independently carried by the higher-order modes. At a second discontinuity, these independently propagating modes can couple again and effect a further exchange of energy between modes.

Systems which contain both nonlinear processes and waveguide discontinuities must therefore contend with the presence of harmonics and of propagating higher-order modes. Such a nonlinear, overmoded situation typically degrades the performance of system devices which are designed to process a fundamental mode but not higher-order modes that are each propagating with different mode patterns and guide wavelengths. In addition, the harmonics may degrade system performance by appearing in other operational frequency bands.

Preferably, the higher-order propagating modes are reduced while the fundamental mode is transmitted. Some waveguide filters (e.g., waffle-iron filters) have the capability of rejecting different higher-order modes but they typically have small vertical gap dimensions which may cause multipacting or arcing in high-power systems. Other waveguide filters (e.g., corrugated filters) can process high power and can be configured to reject a specific higher-order mode. Because their filtering characteristics are a function of a signal's guide wavelength, however, their processing of other modes (such as the fundamental mode) may be unsatisfactory (e.g., see Matthaei, George L., et al., *Microwave Filters, Impedance Matching Networks and Coupling Structures*, Artech House, 1993, Norwood, Mass., section 7.0.4).

SUMMARY OF THE INVENTION

The present invention is directed to waveguide filters that can transmit a fundamental electromagnetic mode in a first frequency band while attenuating an associated higher-order electromagnetic mode in a second frequency band. These goals are achieved with a corrugated waveguide filter that is configured to attenuate the higher-order transverse-electric mode and at least one waveguide ridge system which is coupled between input and output filter ports to support transmission of the fundamental transverse-electric mode.

Although waveguide ridges are conventionally used to lower the cutoff frequency of a waveguide's fundamental mode, it has been found that they can be combined with corrugated structures to support transmission of a fundamental mode in one frequency band while the corrugated structure simultaneously attenuates a higher-order mode in a different frequency band.

In a filter embodiment, input and output waveguide ports have a characteristic impedance and ridge members in different resonant sections of a corrugated filter are extended from a filter wall sufficiently to substantially present the characteristic impedance to the fundamental mode. Accordingly, the ridge members support transmission of the fundamental mode between the input and output ports. The ridge members are preferably positioned in the zeros of the electric field of the mode to be suppressed (i.e., midway between the walls of the corrugated waveguide for a $TE_{20}$ mode) so as to coincide with the maximum electric field of the fundamental mode.

The teachings of the invention can be advantageously used in various systems. In an exemplary spacecraft communication system, for example, waveguide filter of the invention can transmit a fundamental mode and reject a higher-order mode that is generated by nonlinear processes and waveguide discontinuities in a transponder of the communication system. Sufficient rejection of the higher-order mode minimizes the degradation of the overall system performance which would otherwise occur when energy is exchanged with the fundamental mode. Accordingly, the filter enhances the transmitted power while reducing harmonic interference in a receive band of the other transponders.

The novel features of the invention are set forth with particularity in the appended claims. The invention will be best understood from the following description when read in conjunction with the accompanying drawings.

DETAILED DESCRIPTION OF THE PREFERRED EMBODIMENTS

Figure 5:
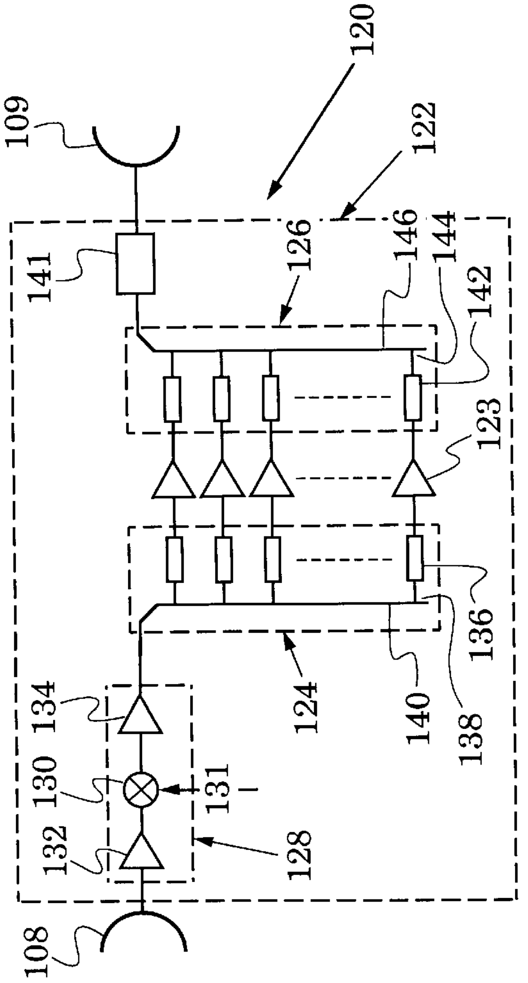
FIG. 5 is a block diagram of a typical transponder in the spacecraft of FIG. 4 which illustrates an exemplary use of the mode filter of FIG. 2.
Figure 2:
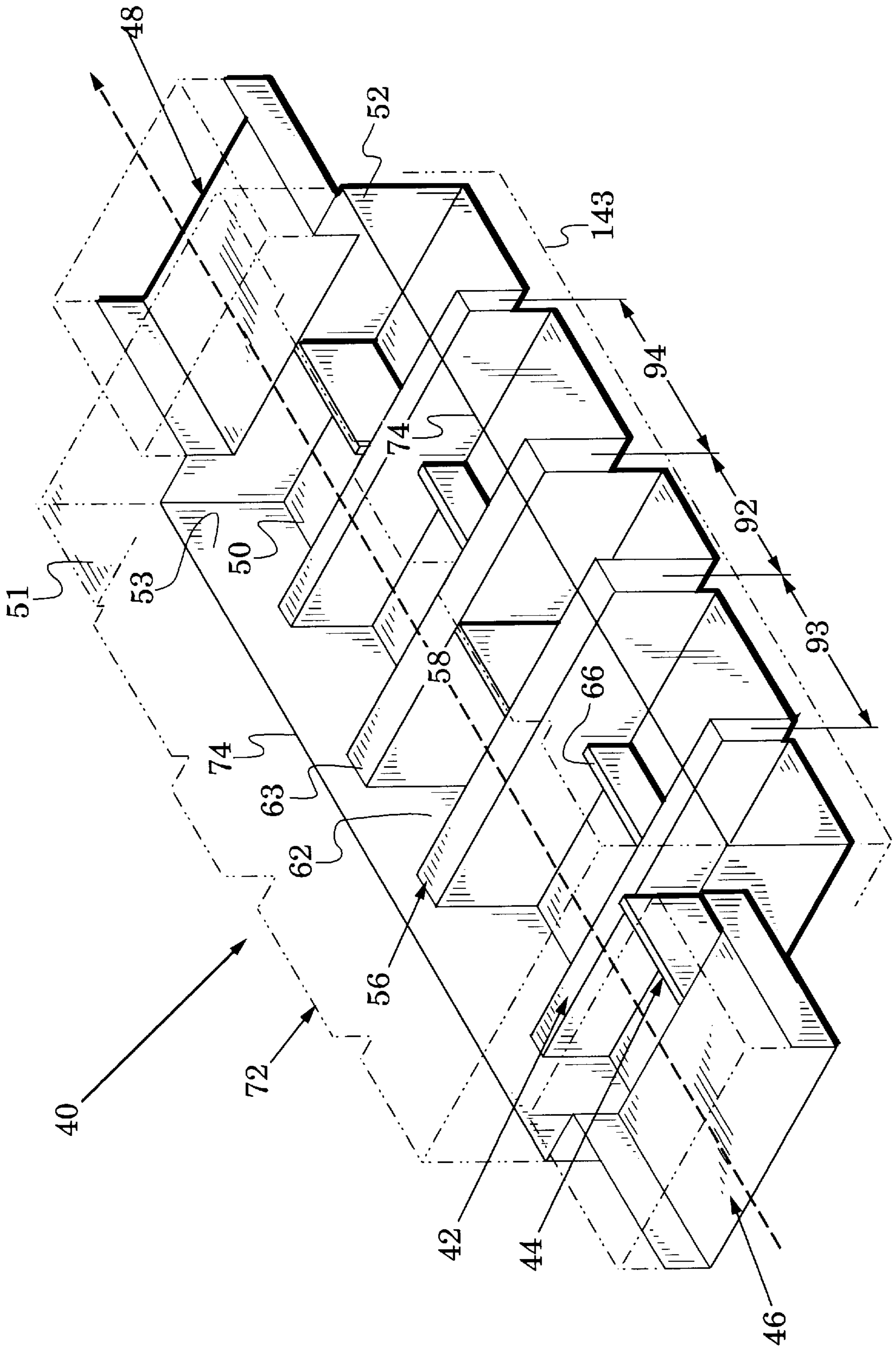
FIG. 2 is a perspective view of a transverse-electric mode filter of the present invention with details of a symmetrical upper half of the filter not shown in order to enhance the clarity of illustration.
Figure 3B:
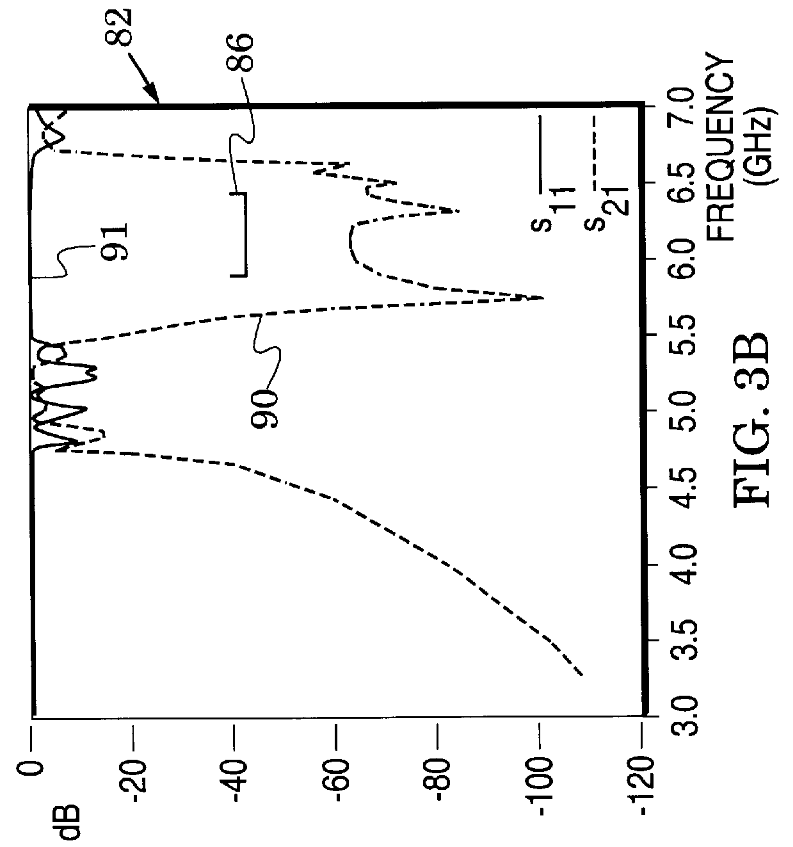
FIGS. 3A and 3B illustrate measured reflection and transmission characteristics in a prototype of the mode filter of FIG. 2.
Figure 3A:
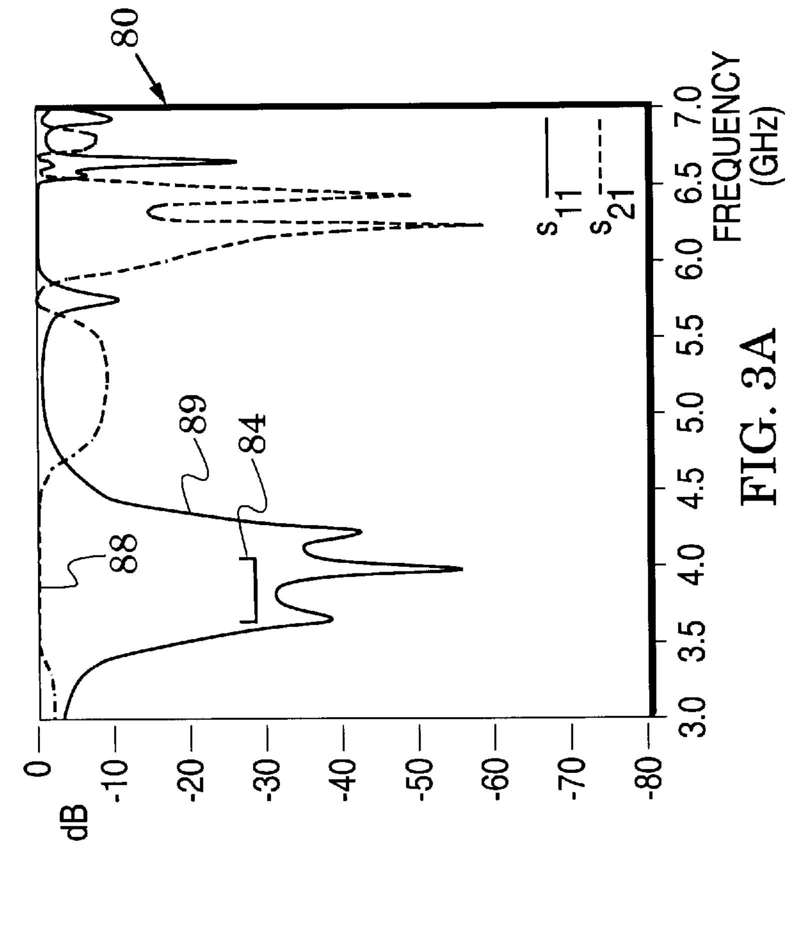
Figure 4:
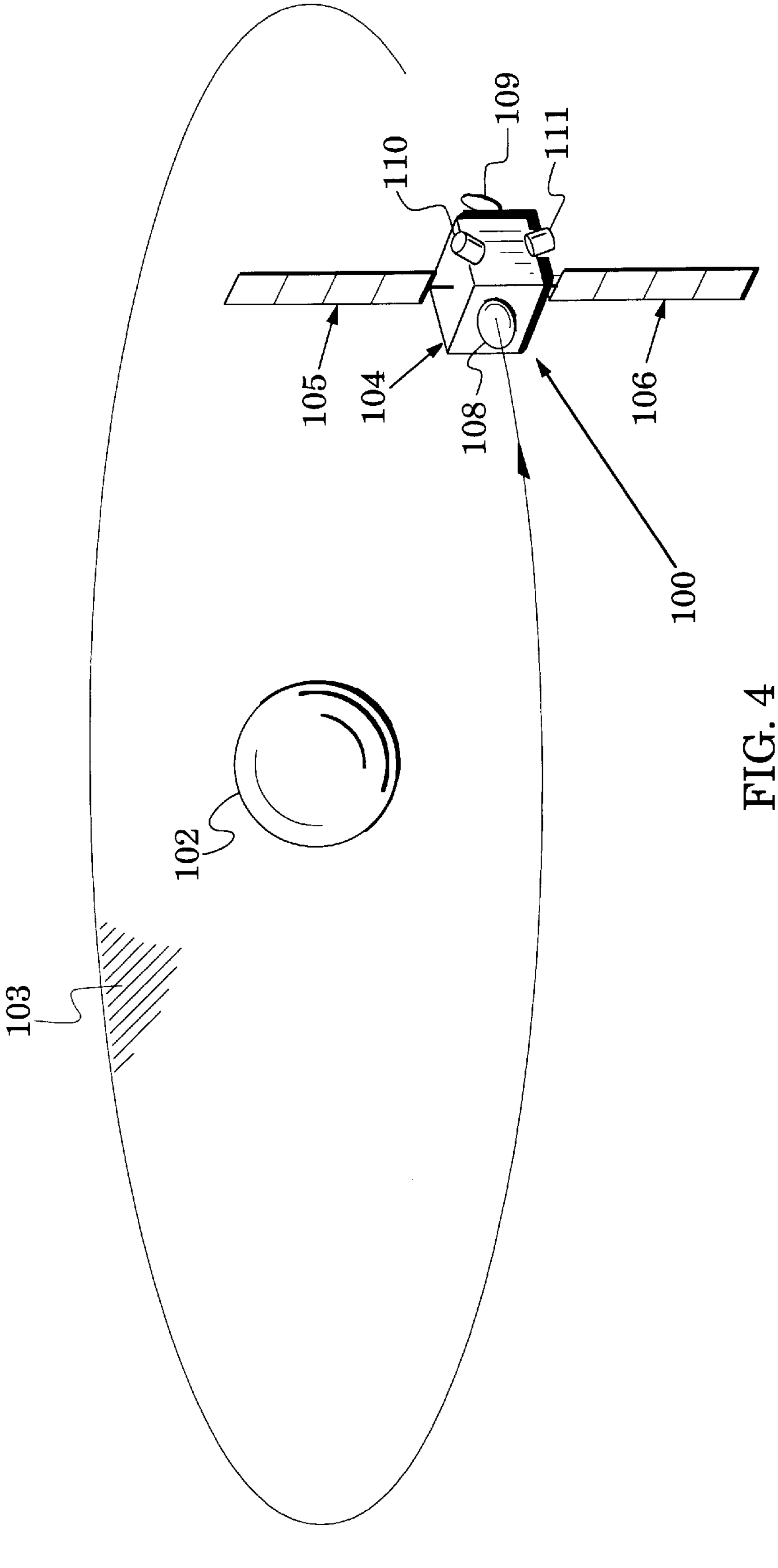
FIG. 4 illustrates a communication spacecraft in an orbital plane about the Earth.

FIG. 2 illustrates a transverse-electric mode filter 40 of the present invention, FIGS. 3A and 3B illustrate measured performance in a prototype of the filter 40 and FIGS. 4, and 5 illustrate a communication system which exemplifies an advantageous use of the filter 40.

As shown in FIG. 2, the transverse-electric mode filter 40 includes a corrugated waveguide filter portion 42 and a ridge system 44 that are coupled between input and output waveguide ports 46 and 48. The corrugated filter portion 42 has first and second laterally-opposed waveguide walls 50 and 51 and third and fourth laterally-opposed waveguide walls 52 and 53 which are orthogonally arranged with the walls 50 and 51. As shown, the wall 50 forms a plurality of corrugations 56 that are arranged transversely to a signal path 58 between the input and output filter ports 46 and 48.

The ridge system 44 is coupled between the input and output ports 46 and 48 and arranged along the signal path 58. In particular, the ridge system 44 extends inward from the wall 51 and is positioned midway between the third and fourth walls 52 and 53 (for a $TE_{20}$ filter). The corrugations 56 form channels 62 and ribs 63 and the ridge system 44 includes a plurality of ridge members 66 which each extend from the wall 51 within a respective channel 62.

The corrugations 56 of the corrugated waveguide filter 42 can be configured and dimensioned to substantially reject a higher-order transverse-electric mode (e.g., a $TE_{20}$ mode). In addition, the ridge system 44 can be dimensioned to present an impedance to a fundamental transverse-electric mode (i.e., a $TE_{10}$ mode) that substantially matches the characteristic impedance of the input and output waveguide ports 46 and 48 to this mode. Accordingly, the ridge system 44 supports transmission of a fundamental transverse-electric mode from the input port 46 to the output port 48.

To enhance the illustration clarity of FIG. 2 an upper portion 72 of the filter 40 above a parting line 74 is indicated only by broken lines. Useful embodiments of the filter 40 can be formed with the corrugations 56 formed in only one of the opposed walls 50 and 51 and with a ridge system 44 carried on only one of these opposed walls. However, other useful embodiments of the filter 40 can be formed with the corrugations 56 formed in each of the opposed walls 50 and 51 and with a ridge system 44 carried on each of these opposed walls. In this latter embodiment, the upper portion 72 of the filter 40 (i.e., the portion above the parting line 74) is identical to the lower portion of the filter 40 (i.e., the portion below the parting line 74). To further enhance the illustration clarity, the wall 52 has been drawn as if it were transparent.

In operation of the waveguide filter 40, the input and output waveguide ports 46 and 48 serve as filter input and output ports. A microwave signal which includes a fundamental electromagnetic mode in a first frequency band and a higher-order electromagnetic mode in a second frequency band is received into the input port 46. In response, the waveguide filter 40 transmits a substantial portion of the fundamental mode to the output port 48 and attenuates a substantial portion of the higher-order mode (i.e., only a reduced portion of the higher-order mode is received at the output port 48).

In particular, the operation of the corrugated waveguide filter 42 presents impedances to the higher-order mode in a higher-impedance/lower-impedance sequence to effect a high degree of signal reflection from the filter 40. At the same time the ridge system 44 forms a signal-path impedance along the signal path 58 to the fundamental mode that substantially matches the characteristic impedance of the waveguide ports 46 and 48 to the fundamental mode. Accordingly, substantially all of the fundamental mode is transmitted to the output port 48.

This operational response is exemplified in FIGS. 3A and 3B in which graphs 80 and 82 show measured reflection (as indicated by an $s_{11}$ scattering parameter) and transmission (as indicated by an $s_{12}$ scattering parameter) in a prototype of the filter 40 of FIG. 2. The prototype was configured to operate with a first frequency band 84 in the region of 3.7 GHz and with a second frequency band 86 in the region of 6.2 GHz.

The filter's performance for a fundamental mode signal $TE_{10}$ is shown in the graph 80. As indicated, the filter's transmission 88 of this signal was very high (the ratio of output signal to input signal was close to 0 dB) in the frequency band 84 while its reflection 89 was below −30 dB. The measurements therefore indicate that a substantial portion of the fundamental mode signal was transmitted to the filter's output port. It is noted that the trasmission characteristic is that of a low pass filter.

The filter's performance for a higher-order mode signal $TE_{20}$ is shown in the graph 82. As indicated, the filter's transmission 90 of this signal was below −60 dB in the frequency band 86 while its reflection 91 was very high (the ratio of reflected signal to input signal was close to 0 dB). The measurements therefore indicate that a substantial portion of the higher-order mode signal was reflected from the filter's input port 46 (i.e., attenuation of the signal which reached the output port was very high).

Procedures for designing the different portions of the invention (e.g., the waveguide ports 46 and 48, the corrugated waveguide filter 42 and the ridge system 44) are well known in the waveguide art. Essentially, the waveguide filter 42 of FIG. 2 is comprised of resonant sections (e.g., the section 92) and the impedances of these sections to a higher-order mode are arranged in a higher-impedance/lower-impedance sequence. For example, the impedance of the resonant section 92 is designed to be lower than the impedances of adjacent resonant sections 93 and 94. This sequence is analogous to low frequency band-reject designs in which a series arrangement of an inductor and a capacitor (low impedance) is coupled between parallel arrangements of an inductor and capacitor (high impedance).

Figure 1A:
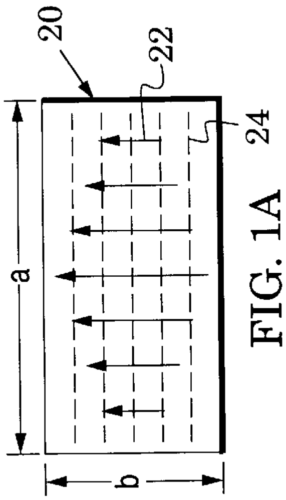
FIG. 1A (PRIOR ART)
FIGS. 1A and 1B respectively illustrate transverse-electric electromagnetic modes $TE_{10}$ and $TE_{20}$ in a rectangular waveguide.
Figure 1B:
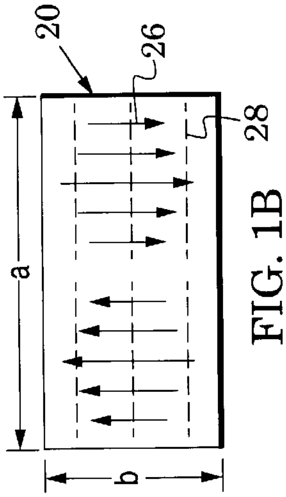
FIG. 1B (PRIOR ART)

The characteristic impedance of the waveguide ports 46 and 48 is conventionally determined by the port dimensions (a and b in FIGS. 1A and 1B) and the frequency. In the channels 62 of the corrugations 63, each of the ridge members 66 is then extended sufficiently from their respective wall (i.e., the wall 50) so that the impedance of the waveguide structure between the input and output ports 46 and 48 substantially matches the characteristic impedance of the ports. This extension is typically less in high-impedance filter sections and greater in low-impedance filter sections. As a result of the impedance matching, fundamental-mode signal reflection at junctions between the waveguide ports and the ridge system 44 is reduced and the ridge system supports transmission of the fundamental mode between the ports.

The teachings of the present invention can be used in a variety of waveguide systems. For example, FIGS. 4 and 5 illustrate a spacecraft communication system whose performance is enhanced with these teachings. In particular, FIG. 4 shows a body-stabilized spacecraft 100 which orbits a celestial body such as the Earth 102 in an orbital plane 103.

The spacecraft 100 includes a body 104 which carries a pair of solar wings 105 and 106 to receive solar radiation and convert it into electrical energy for operation of the spacecraft's systems. The spacecraft body 104 also carries receive and transmit antennas 108 and 109 to facilitate communication with Earth-based communication stations. Typically, the spacecraft 100 also carries systems (e.g., thrusters 110 and 111) for maintaining the spacecraft's assigned orbital station and for maintaining a spacecraft attitude that enhances communication with the Earth-based communication stations.

The receive and transmit antennas 108 and 109 are part of a transponder system 120 which is shown in FIG. 5. The system 120 also includes a frequency converter/amplifier 122 that is coupled between the antennas. The converter/amplifier 122 has a plurality of amplifiers 123 coupled between a demultiplexer 124 and a multiplexer 126. This structure is fed by a frequency conversion subsection 128 in which a mixer 130 and a local oscillator signal 131 are used to frequency convert the output of a low-noise amplifier 132. The frequency conversion subsection 128 typically also includes pre-amplifiers 134 at the converted frequency. The low-noise amplifier 132 is coupled to the receive antenna 108.

Each of the amplifiers 124 is dedicated to a respective frequency channel of the transponder 120. In the demultiplexer 124, channel bandpass filters 136 are coupled through T junctions 138 to a manifold 140 which connects to the subsection 128. Each of the bandpass filters 136 is connected to a respective one of the amplifiers 123. Similarly, channel bandpass filters 142 are coupled through T junctions 144 to a manifold 146 of the multiplexer 126. Each of the bandpass filters 142 is connected to a respective one of the amplifiers 123 and the manifold 146 couples to the transmit antenna 109.

In operation, the transponder 120 receives input communication signals in a receive frequency band (e.g., the frequency band 86 of FIG. 3B), converts the received signals to a transmit frequency band (e.g., the frequency band 84 of FIG. 3A), amplifies the frequency-converted signals and retransmits the converted and amplified signals. In an exemplary communications system, the transponder's receive antenna 108 might be configured and oriented to receive signals from a single Earth-based station and the transponder's transmit antenna 109 might be configured and oriented to transmit signals to an area of the Earth for reception by a plurality of Earth-based stations.

The microwave amplifiers 123 are typically high-power microwave amplifiers (e.g., traveling-wave tubes) whose amplification is a nonlinear process. In addition the demulitplexer 124 and multiplexer 126 typically contain transmission-line discontinuities (e.g., tuning screws, irises, waveguide bends and junctions) which generate higher-order electromagnetic modes.

Although the transponder is configured to generate its output communication signals in a fundamental transverse-electric mode in the transmit frequency band, its nonlinear processes and transmission-line discontinuities will also generate at least one higher-order transverse-electric mode that is not in the transmit band. If not attenuated, this higher-order mode can remove energy from the transmitted signal and degrade the operation of the antenna which is generally optimized for the symmetric $TE_{10}$ mode. In addition, this higher-order mode may be in the region of the receive band of another transponder aboard the spacecraft. If this is the case, a spurious leakage signal accompanies and degrades the receive energy of the Earth signal.

Accordingly, an embodiment 141 of the mode filter 40 of FIG. 2 can be adapted and inserted prior to the transmit antenna 109 as shown in FIG. 5. The filter 141 will transmit the energy in the fundamental mode to the transmit antenna 109 while attenuating the potentially energy-robbing higher-order mode.

As mentioned above, waveguide ridges are conventionally used to lower the fundamental mode cutoff frequency of a waveguide's fundamental mode. Because ridges lower the fundamental mode's cutoff frequency more than the cutoff frequencies of higher-order modes, this structure also widens a waveguide's monomode region. In contrast to this conventional use (e.g., see Matthaei, George L., et al., *Microwave Filters, Impedance Matching Networks and Coupling Structures*, Artech House, 1993, Norwood, Mass., section 3.1.3), the teachings of the invention show that ridge structures can be combined with corrugated structures to support transmission of a fundamental mode in one frequency band while the corrugated structure is attenuating a higher-order mode in a different frequency band. The teachings of the invention can be practiced at a variety of communication frequencies (e.g., C, Ku and Ka band).

For illustrative purposes, the wall 50 has been folded in FIG. 2 to form the channels 62 and ribs 63 of the corrugations 56. The teachings of the invention may, of course, be practiced with various fabricated realizations of this structure. Although such realizations (e.g., cast and machined realizations) will produce the same interior structure, they may produce different exterior surfaces which are exemplified in FIG. 2 by the broken-line lower surfaces 143.

In the filter embodiment of FIG. 2, the filter walls 50–53 are more widely spaced than those of the input and output filter ports 46 and 48. This wall spacing is a function of various filter parameters (e.g., the location of the first and second frequency bands and the location of selected cutoff frequencies) and, accordingly, in different designs it may be greater, substantially equal to or less than that of the ports 46 and 48.

Figure 6A:
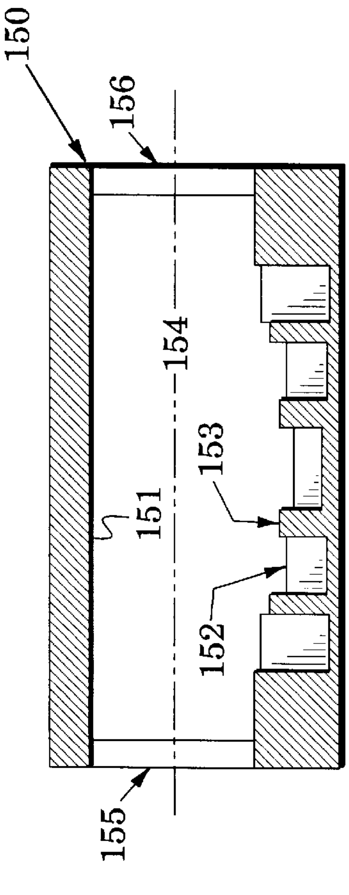
FIGS. 6A and 6B are longitudinal sectional views of other transverse-electric mode filters of the present invention.

It was stated above that embodiments of the filter 40 of FIG. 2 can be formed with the ridge system 44 and the corrugations 56 formed in both or in only one of the opposed walls 50 and 51. Accordingly, FIG. 6A illustrates a filter 150 with a flat upper wall 151 and a ridge system 152 and corrugations 153 in the opposing lower wall. FIG. 6A is a sectional view along a longitudinal center line 154 between a filter entrance 155 and a filter exit 156. In this embodiment, the ridge system 152 enhances transmission of a fundamental mode signal and the corrugations 153 suppress transmission of higher-order (e.g., $TE_{20}$ mode) mode signals.

Figure 6B:
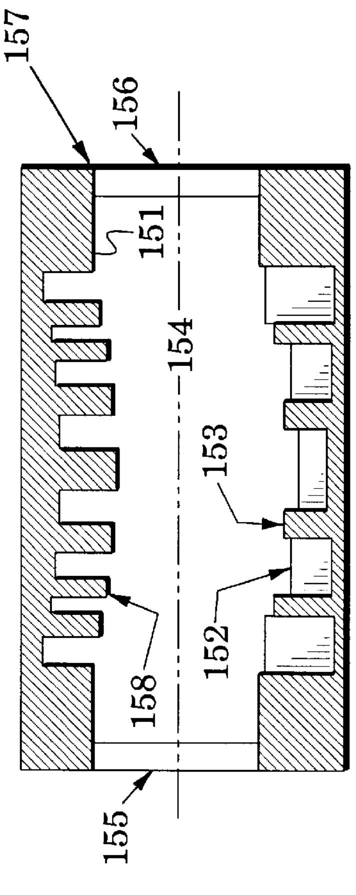

FIG. 6B is a similar view of another filter 157 in which like elements are indicated by like reference numbers. In contrast to the filter 150, this filter embodiment has corrugations 158 in its upper wall 151. In this embodiment, the ridge system 152 continues to enhance transmission of a fundamental mode signal and the corrugations 152 suppress transmission of higher-order mode signals. These fundamental and higher-order mode signals occur at a first frequency. In addition, the corrugations 158 can be configured (in accordance with conventional corrugated filter designs) to suppress transmission of another fundamental mode signal which has a second frequency different from the first frequency.

Because all signals passing through the filter 157 will "see" the corrugation structures in both the upper and lower filter walls, realization of this filter embodiment requires a certain amount of design iteration; a process which is familiar to filter designers.

Filter embodiments such as the filter 157 can be effective in situations where it is desirable to transmit one fundamental mode signal but block higher-order modes of this signal and, at the same time, block another fundamental mode signal. For example, such a filter can be inserted after the receive antenna 108 of FIG. 5. In this application of the filter, the corrugations 158 can be designed to suppress transmission of the transmit signal which is radiated from the transmit antenna 109. Spurious leakage signals in the transmit signal can thus be suppressed with a consequent enhancement of the received Earth signal.

Figure 7:
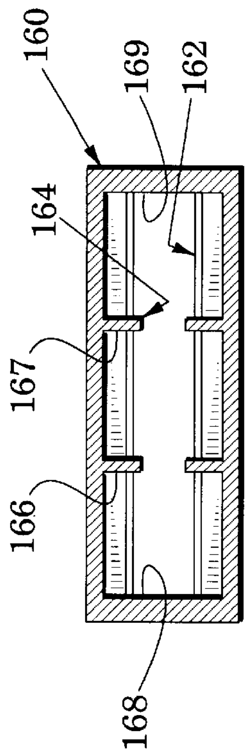
FIG. 7 is a transverse sectional view of another transverse-electric mode filter of the present invention.

The transverse-electric mode filter 40 of FIG. 2 was especially directed to rejection of a higher-order $TE_{20}$ mode and transmission of a fundamental transverse-electric mode. The teachings of the invention can be practiced with various other higher-order modes. For example, FIG. 7 is a transverse cross section through another transverse-electric mode filter 160. In this typical cross section, the filter has a corrugated waveguide filter portion 162 and a ridge system 164. The ridge system includes first and second ridges 166 and 167 between the filter's side walls 168 and 169.

Figure 8A:
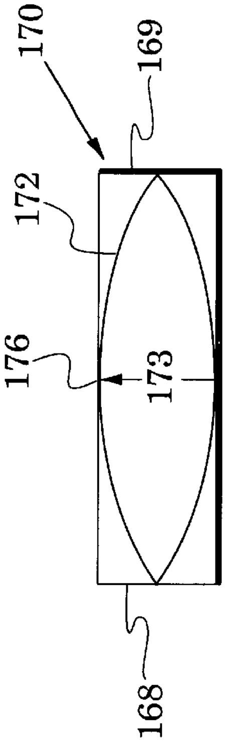
FIGS. 8A and 8B illustrate fundamental and higher-mode electric field distributions in the filter of FIG. 7.
Figure 8B:
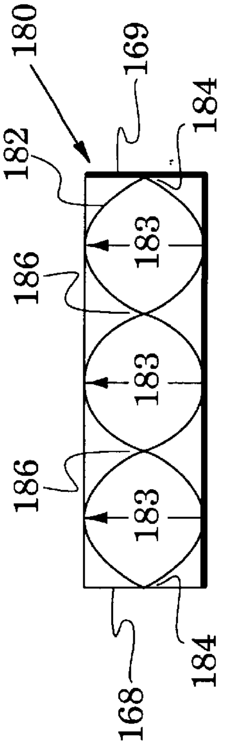

FIG. 8A is a graph 170 which illustrates the fundamental mode's electric field density distribution 172 across the mode filter 160 of FIG. 7 (an exemplary electric field vector 173 is shown for clarity of illustration). The field has minimums at the filter's side walls 168 and 169 and a maximum 176 at the center of the filter. In contrast, FIG. 8B is a graph 180 which illustrates the electric field density distribution 182 of the higher-order $TE_{30}$ mode across the mode filter 160 of FIG. 7 (exemplary electric field vectors 183 are shown for clarity of illustration). This field has three maximums between the side walls 168 and 169. Accordingly, it has minimums 184 at the filter's side walls 168 and 169 and minimums 186 that divide the distribution into three identical transverse portions.

The conventional design of the corrugated filter 42 of FIG. 2 was previously described. In a similar design process, the corrugated waveguide filter 162 can be configured and dimensioned to substantially reject the higher-order $TE_{30}$ mode of FIG. 8B. To support transmission of the fundamental mode, the ridges 166 and 167 need to be in the region of its electric field maximum 176 of FIG. 8A. However, the ridges 166 and 167 are preferably also positioned at minimums 186 of the $TE_{30}$ mode so as to reduce any inadvertent transmission of this higher-order mode. With the ridge positioning of FIG. 7, the ridges 166 and 167 support the transmission of the fundamental mode while being substantially invisible to the higher order mode.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. A waveguide filter for transmitting along a signal path between input and output filter ports, a fundamental transverse-electric mode in a first frequency band while attenuating an associated higher-order transverse-electric mode in a second frequency band, comprising:

a corrugated waveguide filter which includes corrugations that are arranged transversely to said signal path to attenuate said higher-order transverse-electric mode; and at least one ridge system that includes ridge members arranged along said signal path with each abutting at least one of said corrugations to support transmission of said fundamental transverse-electric mode from said input filter port to said output filter port.

2. The filter of claim 1, wherein said corrugated waveguide filter includes first and second opposed walls of which at least one wall forms said corrugations.

3. The filter of claim 2, wherein said corrugations are configured to present impedances to said higher-order transverse-electric mode in a lower impedance and higher impedance sequence.

4. The filter of claim 2, wherein said corrugated waveguide filter includes third and fourth opposed walls which are orthogonally arranged with said first and second walls and wherein said ridge system is carried on at least one of said first and second walls and is positioned between said third and fourth walls to support the electric field of said fundamental transverse-electric mode.

5. The filter of claim 2, wherein:

said input and output filter ports are each waveguide sections having a characteristic impedance to said fundamental transverse-electric mode;

said ridge system is carried on a selected one of said first and second walls; and said ridge system extends sufficiently from said selected wall to form a signal-path impedance to said fundamental transverse-electric mode along said signal path that substantially matches said characteristic impedance.

6. The filter of claim 1, wherein said fundamental transverse-electric mode is a $TE_{10}$ mode and said higher-order transverse-electric mode is a $TE_{20}$ mode.

7. The filter of claim 1, wherein said fundamental transverse-electric mode is a $TE_{10}$ mode and said higher-order transverse-electric mode is a $TE_{30}$ mode.

8. A waveguide filter for transmitting along a signal path between input and output filter ports, a fundamental transverse-electric mode in a first frequency band while attenuating an associated higher-order transverse-electric mode in a second frequency band, comprising:

a corrugated filter portion having input and output waveguide sections that form said input and output filter ports and further having first and second opposed walls coupled between said input and output waveguide sections with at least one of said first and second walls forming a plurality of corrugations which are arranged transversely to said signal path to attenuate said higher-order transverse-electric mode; and a ridge system carried on at least a selected one of said first and second walls and including ridge members arranged along said signal path with each abutting at least one of said corrugations to support transmission of said fundamental transverse-electric mode from said input waveguide section to said output waveguide section.

9. The filter of claim 8, wherein said corrugations are configured to present impedances to said higher-order transverse-electric mode in a lower impedance and higher impedance sequence.

10. The filter of claim 8, wherein:

said input and output waveguide sections have a characteristic impedance;

said corrugations form a plurality of channels; and said ridge members are each positioned in a corresponding one of said channels and extend inward sufficiently from said selected wall to present a signal-path impedance along said signal path that substantially matches said characteristic impedance.

11. The filter of claim 8, further including third and fourth opposed walls which are orthogonally arranged with said first and second walls and wherein said ridge system is positioned between said third and fourth walls to support the electric field of said fundamental transverse-electric mode.

12. The filter of claim 8, wherein said fundamental transverse-electric mode is a $TE_{10}$ mode and said higher-order transverse-electric mode is a $TE_{20}$ mode.

13. The filter of claim 8, wherein said fundamental transverse-electric mode is a $TE_{10}$ mode and said higher-order transverse-electric mode is a $TE_{30}$ mode.

14. A spacecraft communication system, comprising:

a spacecraft; and a transponder carried by said spacecraft, said transponder having:

a) a receive antenna to receive input communication signals in a receive frequency band;

b) a transmit antenna to radiate output communication signals in a transmit frequency band;

c) a frequency converter coupled to said receive antenna to convert said receive frequency band to said transmit frequency band and to generate said output communication signals in a fundamental transverse-electric mode wherein nonlinear processes and waveguide discontinuities in said frequency converter also generate at least one higher-order transverse-electric mode that is not in said transmit frequency band; and d) a waveguide filter having:

1) a corrugated waveguide filter portion which forms an input filter port that is coupled to said frequency converter and an output filter port that is coupled to said transmit antenna wherein said corrugated waveguide filter is configured to attenuate said higher-order transverse-electric mode; and 2) at least one ridge system coupled between said input and output filter ports to support transmission of said fundamental transverse-electric mode from said input filter port to said output filter port.

15. The spacecraft of claim 14, wherein said corrugated waveguide filter portion includes first and second opposed walls of which at least one wall forms corrugations that are arranged transversely to a signal path between said input and output filter ports.

16. The spacecraft of claim 14, wherein:

said input and output filter ports are each waveguide sections having a characteristic impedance;

said ridge system is carried on a selected one of said first and second walls; and said ridge system extends sufficiently from said selected wall so that a signal-path impedance along said signal path substantially matches said characteristic impedance.

17. A method of transmitting along a signal path between input and output ports a fundamental transverse-electric mode in a first frequency band while attenuating an associated higher-order transverse-electric mode in a second frequency band, comprising the steps of:

structuring said input and output ports with a characteristic impedance;

receiving said fundamental transverse-electric mode and said higher-order transverse-electric mode into said input port;

positioning a plurality of corrugations transversely to said signal path to form low and high impedances at said higher-order transverse-electric mode in an alternating arrangement between said input and output ports to thereby attenuate said higher-order transverse-electric mode; and providing ridge members along said signal path that each abuts at least one of said corrugations and substantially matches said characteristic impedance to thereby support transmission of said fundamental transverse-electric mode from said input port to said output port.

18. The filter of claim 17, wherein said fundamental transverse-electric mode is a $TE_{10}$ mode and said higher-order transverse-electric mode is a $TE_{20}$ mode.

* * * * *